US011758548B2

(12) United States Patent
Mitra et al.

(10) Patent No.: US 11,758,548 B2
(45) Date of Patent: *Sep. 12, 2023

(54) COMMUNICATION SYSTEM

(71) Applicant: NEC CORPORATION, Tokyo (JP)

(72) Inventors: Diptendu Mitra, Singapore (SG); Yassin Aden Awad, London (GB)

(73) Assignee: NEC CORPORATION, Tokyo (JP)

( * ) Notice: Subject to any disclaimer, the term of this patent is extended or adjusted under 35 U.S.C. 154(b) by 144 days.

This patent is subject to a terminal disclaimer.

(21) Appl. No.: 17/137,659

(22) Filed: Dec. 30, 2020

(65) Prior Publication Data

US 2021/0120534 A1  Apr. 22, 2021

Related U.S. Application Data

(63) Continuation of application No. 16/896,837, filed on Jun. 9, 2020, now Pat. No. 10,925,052, which is a (Continued)

(30) Foreign Application Priority Data

Jun. 20, 2006 (GB) ...................................... 0612228
Mar. 20, 2007 (GB) ...................................... 0705341

(51) Int. Cl.
*H04W 72/04* (2023.01)
*H04W 4/00* (2018.01)
(Continued)

(52) U.S. Cl.
CPC ........... *H04W 72/23* (2023.01); *H04L 1/1607* (2013.01); *H04L 1/1692* (2013.01);
(Continued)

(58) Field of Classification Search
CPC ... H04L 1/1692; H04L 5/0091; H04L 5/0053; H04L 5/0007
See application file for complete search history.

(56) References Cited

U.S. PATENT DOCUMENTS

| 7,400,898 B2 | 7/2008 | Kang et al. |
| 7,525,908 B2 | 4/2009 | Olsson et al. |

(Continued)

FOREIGN PATENT DOCUMENTS

| CN | 1630227 A  | 6/2005 |
| CN | 1557967 A1 | 10/2005 |

(Continued)

OTHER PUBLICATIONS

NEC Group, Resource Allocation Signalling for E-UTRA, TSG-RAN WGI#44Bis, R1-060830, Mar. 27-31, 2006. Athens, Greece.

(Continued)

*Primary Examiner* — Luat Phung
(74) *Attorney, Agent, or Firm* — Sughrue Mion, PLLC

(57) ABSTRACT

A communications system is described in which user devices are allocated sub-carriers on which to transmit uplink data to a base station. ACK/NACK messages for the data transmitted on the uplink are then transmitted by the base station on sub-carriers that depend on the sub-carriers used to carry the uplink data. A direct mapping function is preferably used to determine the sub-carriers to be used for the ACK/NACK messages from the uplink sub-carriers. In another embodiment, the ACK/NACK messages are transmitted to the user devices on sub-carriers that are previously identified to the user devices, preferably by transmitting one or more index values to the user device in a control channel thereof.

16 Claims, 6 Drawing Sheets

Related U.S. Application Data continuation of application No. 16/205,321, filed on Nov. 30, 2018, now Pat. No. 10,701,680, which is a continuation of application No. 12/308,647, filed as application No. PCT/JP2007/062370 on Jun. 13, 2007, now Pat. No. 10,172,120.

(51) Int. Cl.
| | | |
|---|---|---|
| *H04W 72/23* | (2023.01) | |
| *H04L 1/1607* | (2023.01) | |
| *H04L 5/00* | (2006.01) | |
| *H04W 72/0453* | (2023.01) | |
| *H04W 72/1268* | (2023.01) | |
| *H04L 27/26* | (2006.01) | |

(52) U.S. Cl.
CPC .......... *H04L 5/0053* (2013.01); *H04L 5/0055* (2013.01); *H04L 5/0091* (2013.01); *H04W 72/0453* (2013.01); *H04W 72/1268* (2013.01); *H04L 5/0007* (2013.01); *H04L 5/0064* (2013.01); *H04L 27/2601* (2013.01)

(56) References Cited

U.S. PATENT DOCUMENTS

| | | | |
|---|---|---|---|
| 7,916,623 | B2 | 3/2011 | Kim et al. |
| 8,074,137 | B2 | 12/2011 | Terry et al. |
| 2002/0193106 | A1 | 12/2002 | Koo et al. |
| 2004/0006732 | A1 | 1/2004 | Lundby |
| 2004/0088634 | A1 | 5/2004 | Kim et al. |
| 2004/0153896 | A1 | 8/2004 | Jang |
| 2004/0223507 | A1 | 11/2004 | Kuchibhotla et al. |
| 2004/0224697 | A1 | 11/2004 | Hakkinen et al. |
| 2005/0078629 | A1 | 4/2005 | Bi et al. |
| 2005/0135253 | A1 | 6/2005 | Cai et al. |
| 2005/0195849 | A1* | 9/2005 | Rajkotia ............... H04L 1/0083 370/428 |
| 2005/0201325 | A1* | 9/2005 | Kang .................... H04L 1/1614 370/208 |
| 2005/0232135 | A1 | 10/2005 | Mukai et al. |
| 2005/0286409 | A1 | 12/2005 | Yoon et al. |
| 2005/0288027 | A1 | 12/2005 | Cho et al. |
| 2006/0056282 | A1 | 3/2006 | Das et al. |
| 2006/0133262 | A1 | 6/2006 | Sutivong et al. |
| 2006/0146762 | A1 | 7/2006 | Kuroda et al. |
| 2007/0091837 | A1 | 4/2007 | Li et al. |
| 2007/0183451 | A1 | 8/2007 | Lohr et al. |
| 2007/0218868 | A1 | 9/2007 | Schefczik et al. |
| 2007/0254662 | A1 | 11/2007 | Khan et al. |
| 2007/0258540 | A1* | 11/2007 | Ratasuk ................ H04L 5/0091 375/267 |
| 2008/0049699 | A1 | 2/2008 | Li et al. |
| 2008/0095252 | A1 | 4/2008 | Kim et al. |
| 2008/0159323 | A1 | 7/2008 | Rinne et al. |
| 2008/0214227 | A1 | 9/2008 | Usuda et al. |
| 2009/0047912 | A1 | 2/2009 | Lee et al. |
| 2010/0103882 | A1 | 4/2010 | Rajkotia et al. |

FOREIGN PATENT DOCUMENTS

| | | |
|---|---|---|
| CN | 1685653 A | 10/2005 |
| EP | 1379033 A1 | 1/2004 |
| EP | 1557967 | 7/2005 |
| EP | 1571772 A2 | 9/2005 |
| EP | 1575205 A2 | 9/2005 |
| EP | 1596524 A1 | 11/2005 |
| EP | 1646170 A1 | 4/2006 |
| JP | 2007-528662 A | 10/2007 |
| RU | 2242090 C2 | 12/2004 |
| WO | 92/09148 A1 | 5/1992 |
| WO | 01/76110 A2 | 10/2001 |
| WO | 2005038606 A2 | 4/2005 |
| WO | 2005088886 A1 | 9/2005 |
| WO | 2006052118 A1 | 5/2006 |

OTHER PUBLICATIONS

Office Action dated Nov. 8, 2013 in U.S. Appl. No. 13/412,452.
Office Action dated Nov. 8, 2013 in U.S. Appl. No. 13/412,476.
Office Action dated Apr. 20, 2020 in U.S. Appl. No. 16/804,119.
Qualcomm Europe, DL Phy channels: Overall structure, Agenda item: 5.1.2.4; 3GPP TSG-RAN WG1 LTE Ad Hoc; R1-060170; pp. 1-10; Dated Jan. 23-25, 2006.
R1-070734 "ACK/NAK Channel Transmission in E-UTRA Downlink", TI.
RI-070932 "Assignment ofDownlinkACK/NACK channel", Panasonic.
RI-070791 "Downlink Acknowledgement and Group Transmit Indicator Channels", Motorola.
RI-070867 "ACK/NAK Signal Structure in E-UTRA", NTT DoCoMo, et al.
RI-071223 "Way Forward on Downlink Control Siganling" Ericsson, Nokia, NTT DoCoMo, et al.
Russian Decision on Grant dated Sep. 13, 2010, with English translation.
Russian Office Action dated Apr. 15, 2010, with English translation.
Samsung, Uplink ACK/NACK Performance: FDM vs TDM, Discussion/Decision, 3GPP TSG RAN WG1 Meeting #45, R1-061314, 9 pages total.
Samsung; DL ACK/NACK signalling performance evaluation; Agenda Item: 11.1.1; 3GPP RAN WG1 Meeting #45; R1-061316; pp. 1-5; Dated May 8-12, 2006.
Samsung; Physical Channel Structure and Procedure for EUTRA Downlink; Agenda item: 10.4; 3GPP TSG-RAN WG1 Meeting #42; Tdoc R1-050884; pp. 9; Dated Aug. 29-Sep. 2, 2005.
3GPP TSG RAN WG1 Meeting #45, R1-061257, ZTE, "Considerations on downlink shared control signaling", Shanghai, China, May 8-12, 2006.
3GPP TSG RAN1#45, R1-061165, Motorola, "Downlink Acknowledgement and Group Transmit Indicatior Channels", Shanghai, China, pp. 4, May 8-12, 2006.
3GPP TSG-RAN WG1 #44bis, R1-060996, Ericsson, "E-UTRA Downlink Control Signaling—Text Proposal", Athens, Greece, Mar. 27-31, 2006 (3 pages).
Chinese Office with Search Report dated Nov. 5, 2013 with English translation of Chinese Search Report.
Communication dated Jul. 29, 2014, issued by the U.S. Patent and Trademark Office in counterpart U.S. Appl. No. 13/412,452.
Communication dated Jul. 29, 2014, issued by the U.S. Patent and Trademark Office in counterpart U.S. Appl. No. 13/412,476.
Communication dated Nov. 17, 2014, issued by the State Intellectual Property Office of P.R. China in counterpart Chinese application No. 201210409857.X.
Communication dated Nov. 19, 2018 from the United States Patent and Trademark Office in U.S. Appl. No. 15/490,148.
Ericsson, NTT DoCoMo; E-UTRA Downlink Control Signaling—Overhead Assessment; Agenda Item: 13.1.3; TSG-RAN WG1 #44; R1-060573; pp. 7; Dated Feb. 13-17, 2006.
European Office Action dated Nov. 11, 2009.
NEC Group, NTT DoCoMo, Downlink ACK/NACK Mapping for E-UTRA. TSG-RAN WG1 LTE AdHoc, RI-061884, Cannes, France, Jun. 27-30, 2006.

* cited by examiner

COMMUNICATION SYSTEM

CROSS REFERENCE TO RELATED APPLICATIONS

This application is a Continuation Application of U.S. patent application Ser. No. 16/896,837, filed Jun. 9, 2020, which is a Continuation Application of U.S. patent application Ser. No. 16/205,321, filed Nov. 30, 2018, now U.S. Pat. No. 10,701,680, patented on Jun. 30, 2020, which is a continuation of U.S. application Ser. No. 12/308,647, filed Dec. 19, 2008, now U.S. Pat. No. 10,172,120, patented on Jan. 1, 2019, which is based in on International Application No. PCT/JP2007/062370, filed Jun. 13, 2007, which claims priority from UK Patent Application No. 0705341.6, filed Mar. 20, 2007 and UK Patent Application No. 0612228.7 filed Jun. 20, 2006, the entire contents of which are incorporated herein by reference.

TECHNICAL FIELD

The present invention relates to the signalling of ACK/NACK messages in a communications method and apparatus. The invention has particular, although not exclusive relevance to the signalling ACK/NACK messages in an orthogonal frequency division multiple access (OFDMA) communication system.

BACKGROUND ART

OFDMA and single carrier FDMA have been selected as the downlink and uplink multiple access schemes for the E-UTRA air interface currently been studied in 3GPP (which is a standard based collaboration looking at the future evolution of third generation mobile telecommunication systems). Under the E-UTRA system, a base station which communicates with a number of user devices allocates the total amount of time/frequency resource (depending on bandwidth) among as many simultaneous users as possible, in order to enable efficient and fast link adaptation and to attain maximum multi-user diversity gain. The resource allocated to each user device is based on the instantaneous channel conditions between the user device and the base station and is informed through a control channel monitored by the user device.

When data is transmitted from the user device to the base station, an acknowledgment (ACK) or a non-acknowledgment (NACK) is typically signalled back from the base station to the user device. Under the current proposals for E-UTRA, these ACK/NACK messages are to be sent in the downlink control channel for the user device. However, the inventor has realised that this leads to a problem that the size of the control channel will vary depending on the situation of the user device.

DISCLOSURE OF INVENTION

According to one aspect, the present invention provides a communication method, typically performed in a base station which communicates with a plurality of user devices using a plurality of sub-carriers, the method comprising: receiving uplink data from a user device and generating a corresponding ACK/NACK message for the received data; forming control data defining an allocation of said sub-carriers for the user devices; transmitting said control data to the user devices; and transmitting said ACK/NACK message to the corresponding user devices; wherein said control data is transmitted over a control channel using a first subset of said sub-carriers and said ACK/NACK message is transmitted on an ACK/NACK channel that is separate from said control channel using a second different subset of said sub-carriers.

Preferably the sub-carriers are grouped into a sequence of chunks or resource blocks (RBs) and the control channel allocates one or more chunks of sub-carriers to each of the plurality of user devices. In one embodiment, an ACK/NACK message is generated for the data received on each chunk of sub-carriers.

Preferably the sub-carriers to be used to transmit an ACK/NACK message to a user device are determined in dependence upon the sub-carriers allocated to that user device for transmitting the uplink data that is being acknowledged. This avoids the need for the base station to separately signal data to each user device identifying the sub-carriers that will carry the ACK/NACK messages for that user device. The dependence between the sub-carriers used for the uplink data and the sub-carriers used for the ACK/NACK messages is preferably defined by a direct mapping function.

In one embodiment, the sub-carriers to be used to transmit each ACK/NACK message are determined using the following mapping function:
Position[0]=L*(i div M)+(i mod M)+$\Delta$
where 0<=$\Delta$<L
For j>0
Position[j]=Position[j−1]+L*N/M
where L is the number of sub-carriers in a chunk; i is the chunk number allocated to the user device to which the ACK/NACK message is to be transmitted; M is the number of sub-carriers allocated per ACK/NACK channel; $\Delta$ is the ACK/NACK sub-carrier position offset within a chunk; and N is the total number of chunks within the allocated bandwidth.

In an alternative embodiment, the sub-carriers to be used to transmit each ACK/NACK message are determined using the following mapping function:
Position[0]=L*i+$\Delta$
where 0<=$\Delta$<L
For j>0 and j<M
Position[j]=((Position[j−1]+L*N/M) mod L*N) in symbol j*$N_{sym}$/M
where L is the number of sub-carriers in a chunk; i is the chunk number allocated to the user device to which the ACK/NACK message is to be transmitted; M is the number of sub-carriers allocated per ACK/NACK channel; $\Delta$ is the ACK/NACK sub-carrier position offset within a chunk; N is the total number of chunks within the allocated bandwidth; and $N_{sym}$ is the number of available symbols in which the sub-carriers can be allocated.

In one embodiment, the resources used for ACK/NACK messages are signalled to the respective user devices over their L1/L2 control channel which identifies the uplink resources to be used for their uplink transmissions. This can be achieved, for example, by signalling at least one index identifying the resource(s) that will be used.

The invention also provides a communication method (that is typically performed in a user device) which uses a plurality of sub-carriers, the method comprising: receiving control data defining an allocation of said sub-carriers; transmitting uplink data using the allocated sub-carriers; and receiving ACK/NACK messages for the transmitted uplink data; wherein said control data is received over a control channel using a first subset of said sub-carriers and said ACK/NACK messages are received on an ACK/NACK channel that is separate from said control channel using a second different subset of said sub-carriers.

In one embodiment the receiving step receives an ACK/NACK message for the uplink data transmitted on each chunk of sub-carriers.

In a preferred embodiment the sub-carriers on which an ACK/NACK message is to be received are determined in dependence upon the sub-carriers allocated to the user device for transmitting said uplink data. This removes the need for the station transmitting the ACK/NACK messages to inform the user device of the sub-carriers that it will use to carry the ACK/NACK messages for that user device. The dependence between the sub-carriers used for the uplink data and the sub-carriers used for the ACK/NACK messages is preferably defined by a direct mapping function.

In one embodiment the user device determines the sub-carriers on which each ACK/NACK message is to be received using the following mapping function:
Position[0]=L*(i div M)+(i mod M)+$\Delta$
where 0<=$\Delta$<L
For j>0
Position[j]=Position[j−1]+L*N/M
where L is the number of sub-carriers in a chunk; i is the chunk number allocated to the user device to which the ACK/NACK message is to be transmitted; M is the number of sub-carriers allocated per ACK/NACK channel; $\Delta$ is the ACK/NACK sub-carrier position offset within a chunk; and N is the total number of chunks within the, allocated bandwidth.

In another embodiment the user device determines the sub-carriers on which each ACK/NACK message is to be received using the following mapping function:
Position[0]=L*i+$\Delta$
where 0<=$\Delta$<L
For j>0 and j<M
Position[j]=((Position[j−1]+L*N/M) mod L*N) in symbol j*$N_{sym}$/M
where L is the number of sub-carriers in a chunk; i is the chunk number allocated to the user device to which the ACK/NACK message is to be transmitted; M is the number of sub-carriers allocated per ACK/NACK channel; $\Delta$ is the ACK/NACK sub-carrier position offset within a chunk; N is the total number of chunks within the allocated bandwidth; and $N_{sym}$ is the number of available symbols in which the sub-carriers can be allocated.

In one embodiment, the resources that will be used for ACK/NACK messages are signalled to the user device over their control channel. This can be achieved, for example, by signalling an index value identifying each resource that will be used.

The present invention also provides a communication node and a user device operable to perform the methods discussed above.

According to another aspect, the invention provides a communication method which uses a plurality of sub-carriers, the method comprising: forming control data defining an allocation of said sub-carriers for each of a plurality of user devices; transmitting said control data to said user devices; receiving uplink data from a user device; generating an ACK/NACK message for the user device; determining one or more sub-carriers to be used to transmit the ACK/NACK message to the user device, in dependence upon the sub-carriers allocated to that user device; and transmitting said ACK/NACK message to user device on the determined one or more sub-carriers.

In one embodiment the determining step used a predetermined mapping between the allocated sub-carriers and the sub-carriers used for the ACK/NACK message. In one embodiment the following mapping is used:
Position[0]=L*(i div M)+(i mod M)+$\Delta$
where 0<=$\Delta$<L
For j>0
Position[j]=Position[j−1]+L*N/M
where L is the number of sub-carriers in a chunk; i is the chunk number allocated to the user device to which the ACK/NACK message is to be transmitted; M is the number of sub-carriers allocated per ACK/NACK channel; $\Delta$ is the ACK/NACK sub-carrier position offset within a chunk; and N is the total number of chunks within the allocated bandwidth.

In another embodiment the following mapping can be used:
Position[0]=L*i+$\Delta$
where 0<=$\Delta$<L
For j>0 and j<M
Position[j]=((Position[j−1]+L*N/M) mod L*N) in symbol j*$N_{sym}$/M
where L is the number of sub-carriers in a chunk; i is the chunk number allocated to the user device to which the ACK/NACK message is to be transmitted; M is the number of sub-carriers allocated per ACK/NACK channel; $\Delta$ is the ACK/NACK sub-carrier position offset within a chunk; N is the total number of chunks within the allocated bandwidth; and $N_{sym}$ is the number of available symbols in which the sub-carriers can be allocated.

This aspect of the invention also provides a communication method which uses a plurality of sub-carriers, the method comprising: receiving control data defining an allocation of said sub-carriers on which uplink data can be transmitted; transmitting said uplink data; determining one or more sub-carriers to be used to receive an ACK/NACK message for the transmitted uplink data, in dependence upon the sub-carriers allocated for transmitting said uplink data; and receiving an ACK/NACK message for the transmitted uplink data on the determined sub-carriers. Typically the sub-carriers on which the ACK/NACK message is to be received will be different from the sub-carriers used to transmit the uplink data and are related to them through a mapping function, such as the ones discussed above.

BRIEF DESCRIPTION OF DRAWINGS

These and various other aspects of the invention will become apparent, from the following detailed description of embodiments which are given by way of example only and which are described with reference to the accompanying Figures in which.

BEST MODE FOR CARRYING OUT THE INVENTION

Overview

Figure 1:
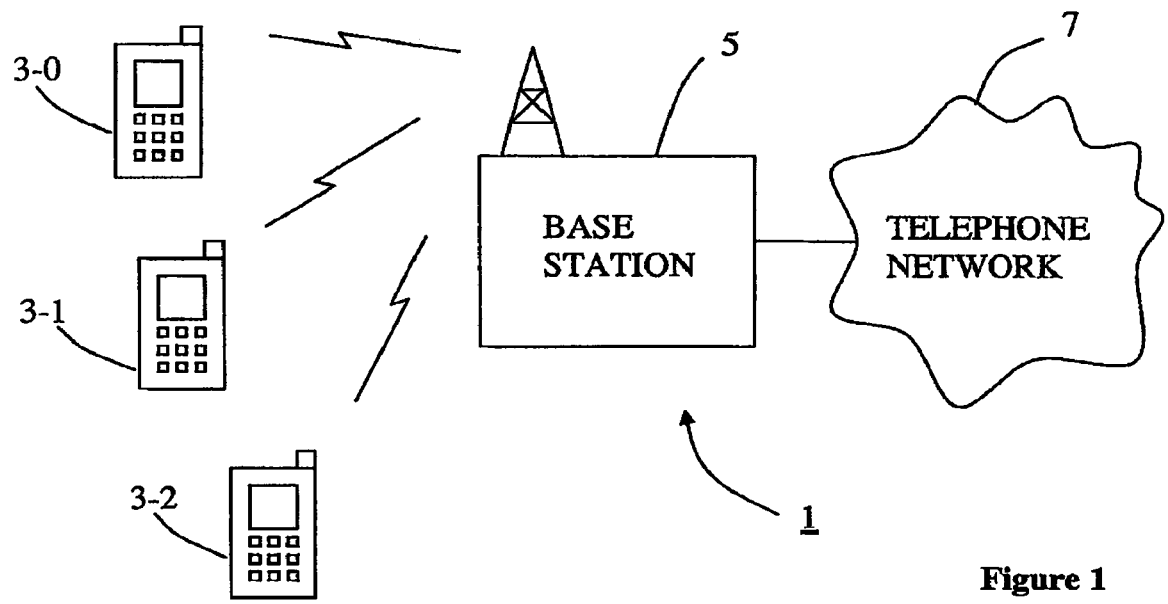
FIG. 1 schematically illustrates a communication system comprising a number of user mobile (cellular) telephones which communicate with a base station connected to the telephone network.

FIG. 1 schematically illustrates a mobile (cellular) telecommunication system 1 in which users of mobile telephones (MT) 3-0, 3-1, and 3-2 can communicate with other users (not shown) via a base station 5 and a telephone network 7. In this embodiment, the base station 5 uses an orthogonal frequency division multiple access (OFDMA) technique in which the data to be transmitted to the mobile telephones 3 is modulated onto a plurality of sub-carriers. Different sub-carriers are allocated to each mobile telephone 3 depending on the supported bandwidth of the mobile telephone 3 and the amount of data to be sent to the mobile telephone 3. In this embodiment the base station 5 also allocates the sub-carriers used to carry the data to the respective mobile telephones 3 in order to try to maintain a uniform distribution of the mobile telephones 3 operating across the base station's bandwidth. To achieve these goals, the base station 5 dynamically allocates sub-carriers for each mobile telephone 3 and signals the allocations for each sub-frame to each of the scheduled mobile telephones 3. In the proposed E-UTRA air interface, each downlink sub-frame comprises a sequence of seven OFDM symbols. The first two symbols typically carry the scheduling and resource allocation control data as well as other general control data whilst the remaining five symbols contain the user data for the downlink.

Figure 2:
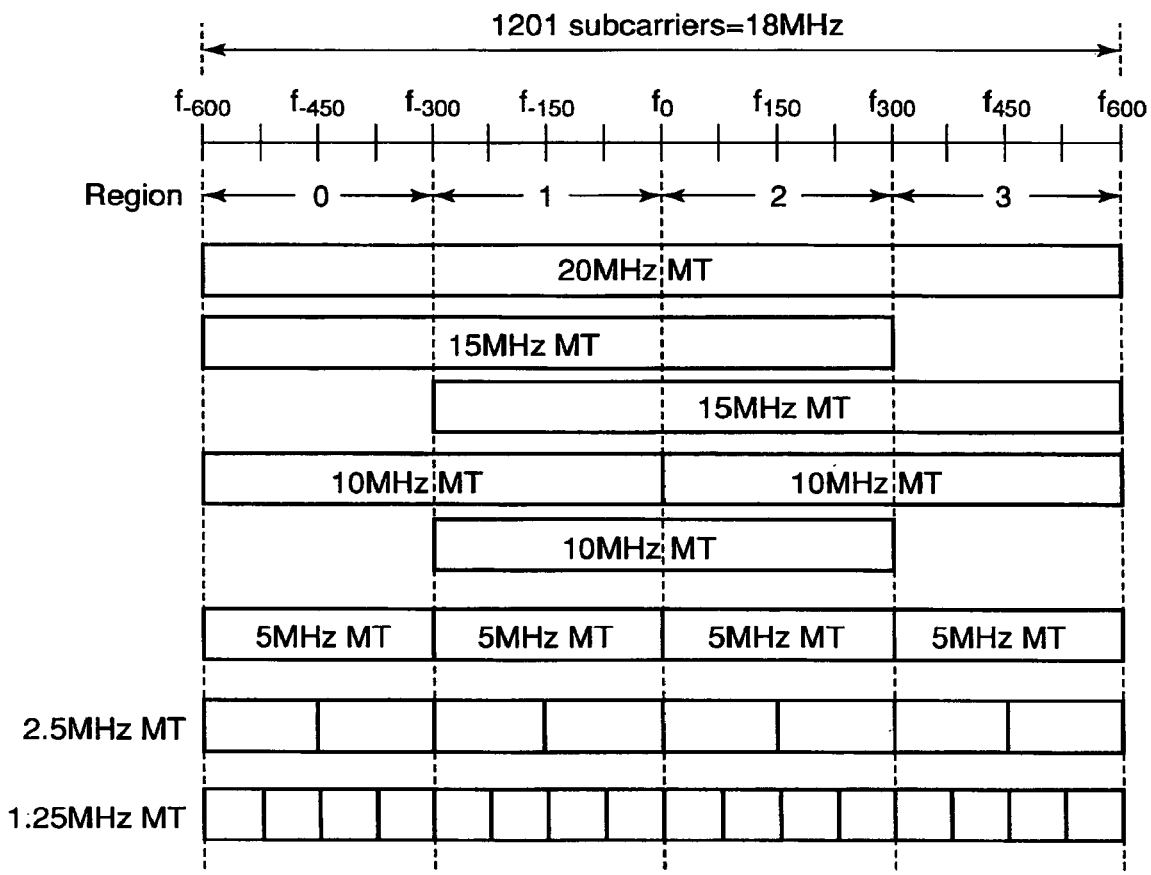
FIG. 2 illustrates the way in which a communication bandwidth of the base station shown in FIG. 1 can be allocated to a number of different mobile telephones having different supported bandwidths.

FIG. 2 illustrates an example of the way in which the base station 5 can allocate sub-carriers within its supported bandwidth to different mobile telephones 3 having different supported bandwidths. In this embodiment, the base station 5 has a supported bandwidth of 20 MHz of which 18 MHz is used for data transmission. Typically each mobile telephone 3 is allocated one or more chunks of sub-carriers on which to transmit their uplink data.

In order that each of the mobile telephones 3 can be informed about the scheduling decision within each sub-band, each mobile telephone 3 requires a shared control channel within its camped frequency band. The current proposal for the E-UTRA air interface specifies that this control channel will include:

i) resource block allocation information (for both downlink (DL) communications and uplink (UL) communications);
ii) resource block demodulation information for the downlink;
iii) resource block demodulation information for the uplink;
iv) ACK/NACK for uplink transmissions; and
v) timing control bits.

Therefore, given the different types of information that the control channel must carry, the size of the control channel will depend on the individual mobile telephone's situation. Examples of situations that lead to different control channel sizes are given in the following table:

| Case | | DL Scheduling Information | UL Scheduling Information | ACK/NACK |
|---|---|---|---|---|
| 1 | MT scheduled on UL and DL, and awaiting ACK/NACK | Required | Required | Required |
| 2 | MT scheduled on DL only, and awaiting ACK/NACK | Required | | Required |
| 3 | MT scheduled on UL only, and awaiting ACK/NACK | | Required | Required |
| 4 | MT not scheduled on UL or DL, and awaiting ACK/NACK | | | Required |
| 5 | MT scheduled on UL and DL, not awaiting ACK/NACK | Required | Required | |
| 6 | MT scheduled on DL only, not awaiting ACK/NACK | Required | | |
| 7 | MT scheduled on UL only, not awaiting ACK/NACK | | Required | |

The inventor has realised that having control channels of different sizes will create problems, as either the sizes of the control channels will have to be signalled to the mobile telephones 3 or the receiving mobile telephones 3 will have to consider all possible sizes to try to recover the control channel data. The inventor has realised that this problem can be avoided or at least mitigated by removing the ACK/NACK field from the control channel itself into a dedicated (semi-static) time/frequency resource. In addition, if a mobile telephone 3 is scheduled on both UL and DL then the UL scheduling information can be contained within the allocated DL resource block. This leaves two cases for the DL control channel size:

Type 1: DL Scheduling Information (used in cases 1, 2, 5 and 6 above)

Type 2: UL Scheduling Information (used in cases 3 and 7 above)

First Embodiment

The inventor proposes that one or more sub-carriers in the downlink be reserved for carrying ACK/NACK information for mobile telephones 3 expecting such information in the downlink. The number of resources reserved for such usage and their locations in the time/frequency plane can be intimated to the mobile telephones through common signalling. In this embodiment, to reduce the signalling required to inform the mobile telephones of which sub-carriers carry their ACK/NACK information, the mobile telephones are programmed to work out on which sub-carriers their ACK/NACK information will be transmitted using the UL chunk allocation for the data being acknowledged and information obtained from the common signalling channel. There are various techniques that can be used to perform the actual mapping between the allocated chunks for uplink transmissions and the sub-carriers allocated for the corresponding ACK/NACK messages.

First Example Mapping

In this example, the mobile telephones 3 are informed by the base station 5 over the common signalling channel the number (M) of sub-carriers allocated by the base station 5 to each ACK/NACK channel, with one ACK/NACK channel being used to acknowledge the data transmitted on one chunk of sub-carriers by a mobile telephone 3. Therefore, if a mobile telephone 3 is allocated two chunks for uplink transmissions, then two ACK/NACK channels will be used to transmit the ACK/NACK commands (messages) for that mobile telephone 3. In this example, the base station 5 also informs the mobile telephones 3 what the ACK/NACK sub-carrier position offset (Δ) is within a chunk. Each mobile telephone 3 then determines the mapping between each uplink transmitted chunk number (i) on which it transmits data and the sub-carriers of the corresponding ACK/NACK channel as below:

Position[0]=L*(i div M)+(i mod M)+Δ
where 0<=Δ<L
For j>0
Position[j]=Position[j−1]+L*N/M where L is the number of sub-carriers in each chunk and N is the total number of chunks in the allocated bandwidth, both of which will typically (although not necessarily) be static for the system design and programmed into the mobile telephone 3 and the base station 5.

Position[j] is the sub-carrier number used to transmit the jth ACK/NACK symbol. The range of Position[j] is 0 to (L*N)−1, where L*N is the total number of active sub-carriers in the system bandwidth. The range of j is 0 to M−1, where M is the number of symbols in one ACK/NACK message.

Figure 3:
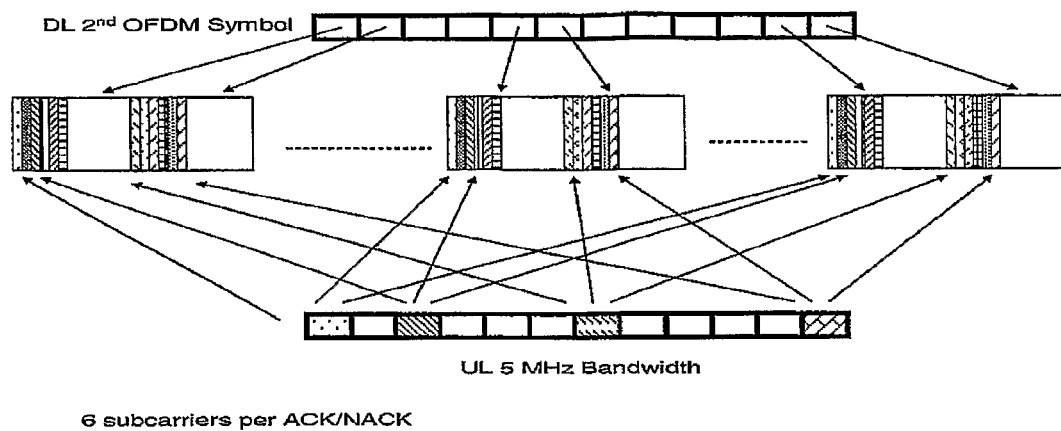
FIG. 3 illustrates the way in which sub-carriers in the downlink can be reserved for carrying the ACK/NACK information.

FIG. 3 demonstrates the case for N=12, L=25, M=6 and Δ=0, where all the ACK/NACK's are multiplexed within the second OFDM symbol of a downlink sub-frame. As shown, the multiplexing illustrated in FIG. 3 is designed to support a maximum of 12 simultaneous users within the 5 MHz band (in which each user is allocated one chunk) with each chunk being acknowledged by a six sub-carrier ACK/NACK channel. The use of these sub-carriers will obviously reduce the number of sub-carriers available in the second OFDM symbol for the downlink control channel. However, this structure also allows support of a micro-sleep mode at the mobile telephones 3, since a mobile telephone 3 expecting an ACK/NACK (and not scheduled to receive other downlink data) need monitor only the first two OFDM symbols and then enter the micro-sleep mode.

Preferably the transmitted power of each ACK/NACK command is inversely proportional to the number of chunks allocated the mobile telephone 3 in the uplink, so that the total energy per ACK/NACK command is independent of the number of chunks being acknowledged.

As those skilled in the art will appreciate, M needs to be a factor of N in order to exploit the full frequency diversity with an equally spaced ACK/NACK sub-carrier distribution.

Another mechanism of the TDM mapping scheme illustrated in FIG. 3 is to spread the N*M ACK/NACK sub-carriers uniformly over the entire band within the second OFDM symbol. However, if M is not a factor of L, the ACK/NACK spacing will be non-uniform in this case.

Second Example Mapping

Instead of allocating the sub-carriers for the ACK/NACK channels in one OFDM symbol, in an alternative allocation, they are allocated across multiple symbols. For example, the ACK/NACK resources can be scattered over the remaining (all but the first OFDM symbol which contains the pilot and control channels only) OFDM symbols.

In this example, the base station 5 will inform the mobile telephones 3 of the number (M) of sub-carriers per ACK/NACK channel, an ACK/NACK sub-carrier position offset (Δ) within a chunk and the number ($N_{sym}$) of available OFDM symbols, and the mobile telephones 3 will determine the mapping between the uplink transmitted chunk number i and the corresponding downlink ACK/NACK sub-carriers as below:

Position[0]=L*Δ
where 0<=Δ<L
For j>0 and j<M
Position[j]=((Position[j−1]+L*N/M) mod L*N) in symbol j*$N_{sym}$/M Position[j] is the sub-carrier number used to transmit the jth ACK/NACK symbol. The range of Position[j] is 0 to (L*N)−1, where L*N is the total number of active sub-carriers in the system bandwidth. The range of j is 0 to M−1, where M is the number of symbols in one ACK/NACK message.

Figure 4:
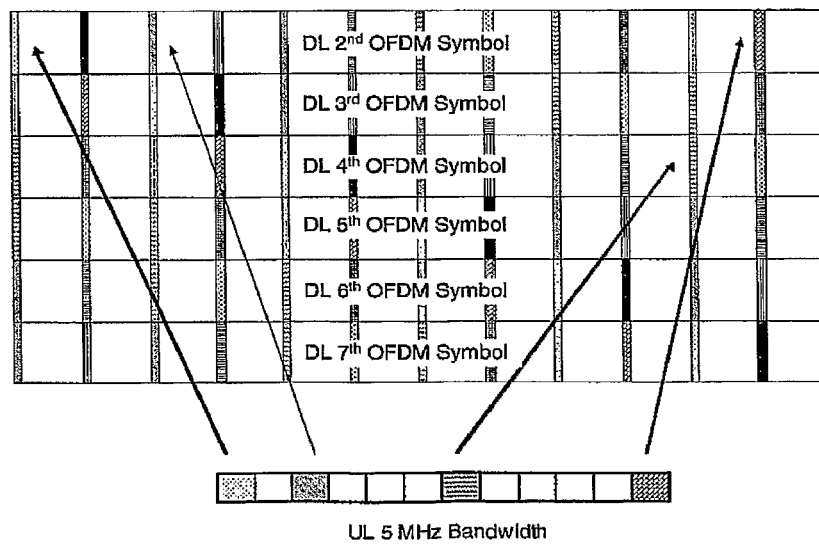
FIG. 4 illustrates an alternative way in which sub-carriers in the downlink can be reserved for carrying the ACK/NACK information.

FIG. 4 illustrates the case for N=12, L=25, M=6, Δ=0 and $N_{sym}$=6. As those skilled in the art will appreciate, with this type of mapping, the chunk bandwidth for user data is only reduced by a single sub-carrier within each symbol, however, the micro-sleep mode possibility is reduced. Further, in order to enable a uniform spacing of the ACK/NACK commands in the time domain, M needs to be a factor of $N_{sym}$.

Downlink Control Channel Size

Assuming one of the above structures for the ACK/NACK channels, the number of bits needed in the downlink control channel for a 5 MHz bandwidth mobile telephone 3 can be derived as follows—

| Information bits | Type 1 | Type 2 |
|---|---|---|
| Type Indicator | 1 | 1 |
| DL Resource Allocation | 12 (bit mask) | |
| DL Resource Duration | 3 | |
| DLTFCI | 6 | |
| UL Scheduling Info is present in DT, resource block | 1 | |
| UL Resource Allocation | | 7 (tree method) |
| UL Resource Duration | | 3 |
| UL Category 2 Information | | 10 |
| Padding bits | 0 | 2 |
| CRC (Masked with UE ID) | 10 | 10 |
| Total information + CRC bits | 33 | 33 |
| Encoded bits (1/3 tail biting) | 99 | 99 |
| After rate matching | 100 | 100 |
| Number of sub-carriers (QPSK) | 50 | 50 |
| Number of chunks | 2 | 2 |

Padding bits are used in this embodiment to make the number of encoded bits the same for Type 1 and Type 2 so that the mobile telephones 3 only need to perform one decoding attempt. Slightly modified structures without any padding bits can also be envisaged if required by the design.

Figure 5:
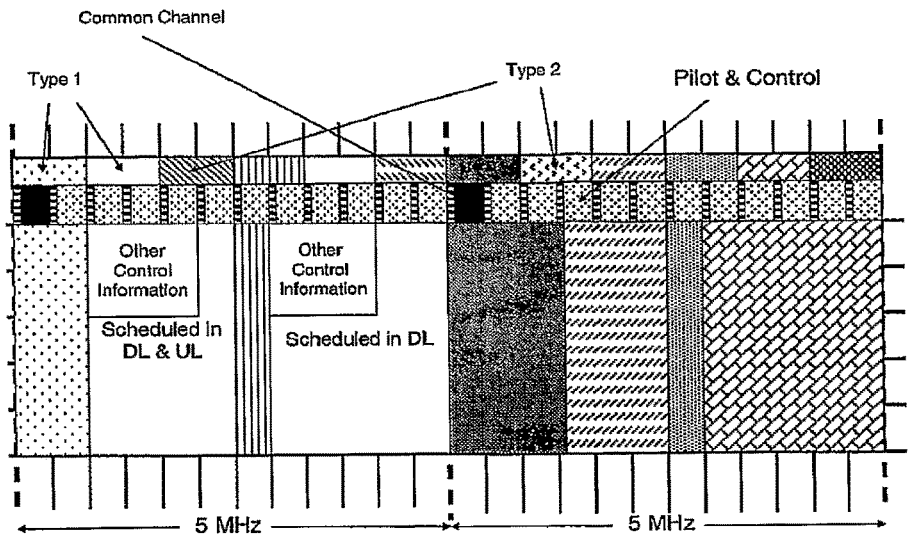
FIG. 5 illustrates a proposed control channel mapping that uses two types of downlink control channels of the same size.

An example of the proposed control channel mapping is shown in FIG. 5. In this figure we assume that control channels are individually coded in order to allow efficient power control and possible beam-forming techniques. Control channel positions are shown in the first OFDM symbol only while the second symbol is assumed to carry pilot and additional control information. Each scheduled mobile telephone 3 is assumed to have been allocated one control channel within 5 MHz with higher bandwidth capable mobile telephones 3 decoding multiple such channels. When possible, the frequency position of the control channel should be chosen to span the resources (sub-carriers) on which the user data is scheduled in order to exploit the superior channel characteristics at these frequency positions. FIG. 5 shows a case when a maximum of twelve possible users are scheduled within 10 MHz. In case the number of users is less, some of the control channel resources can be freed and occupied by user data. The absence of a control channel in a specific position can be indicated using a single bit field in the preceding control channel.

As shown in FIG. 5, Type 1 and Type 2 control channels are each assumed to span 2 chunks. The total number of control channels possible depends on the mapping adopted for the ACK/NACK channels which has not been shown in the figure.

The structure of the ACK/NACK resource allocation can be further simplified by allocating only mobile telephones 3 without a downlink resource allocation within the same sub-frame. A mobile telephone 3 with a downlink scheduling message in the same sub-frame can be intimated about ACK/NACK's within the downlink resource block (user data). In such a case, a single bit ACK/NACK will suffice since the control information within the downlink resource block will have its own error coding protection. However, an error in the control channel detection in this case will also lead to the inability of the mobile telephone 3 from being able to retrieve ACK/NACK information which may, in turn, put tighter performance requirements on the downlink control channel.

Base Station

Figure 6:
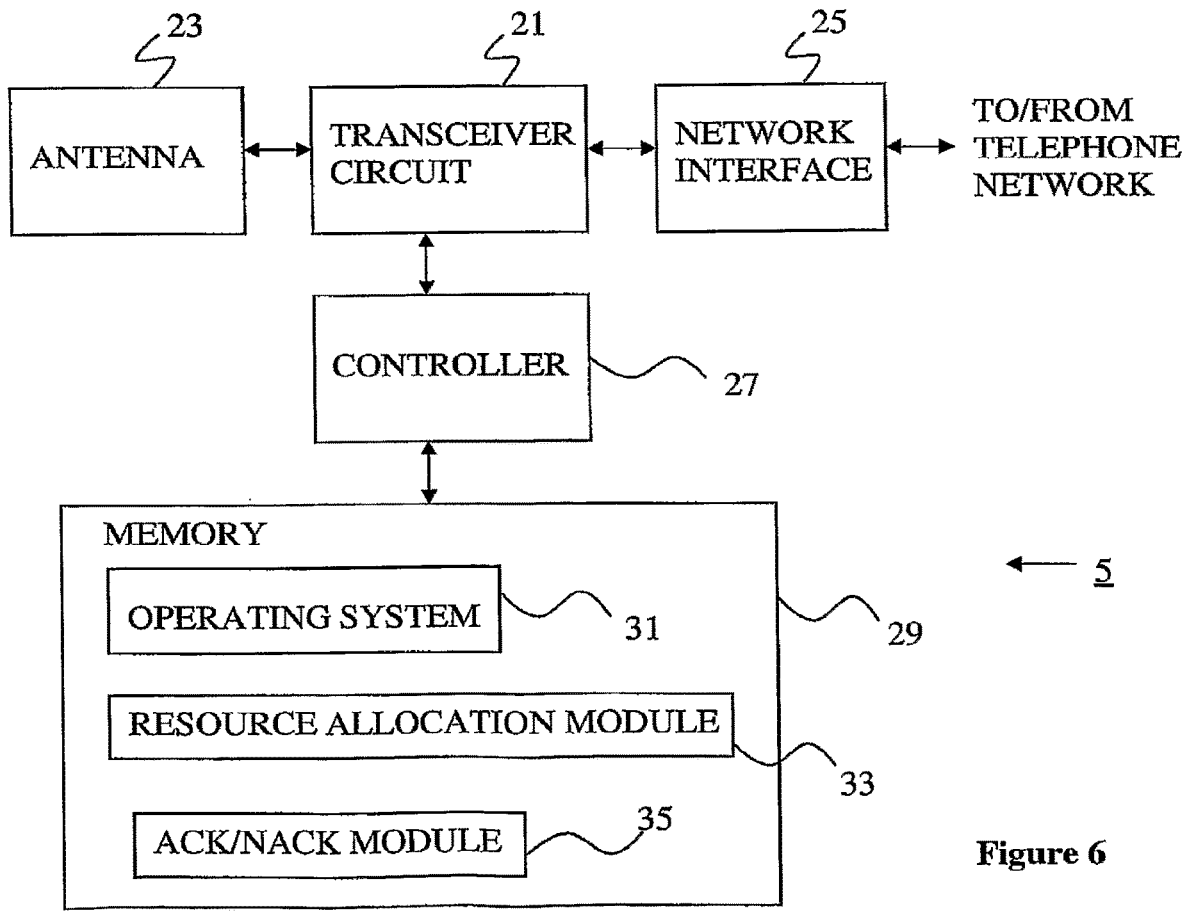
FIG. 6 is a block diagram illustrating the main components of the base station shown in FIG. 1.

FIG. 6 is a block diagram illustrating the main components of the base station 5 used in this embodiment. As shown, the base station 5 includes a transceiver circuit 21 which is operable to transmit signals to and to receive signals from the mobile telephones 3 via one or more antennae 23 (using the above described sub-carriers) and which is operable to transmit signals to and to receive signals from the telephone network 7 via a network interface 25. The operation of the transceiver circuit 21 is controlled by a controller 27 in accordance with software stored in memory 29. The software includes, among other things, an operating system 31 and a resource allocation module 33. The resource allocation module 33 is operable for allocating the sub-carriers used by the transceiver circuit 21 in its communications with the mobile telephones 3. The software also includes an ACK/NACK module 35, which is operable for informing the mobile telephones 3 of the information needed to map between the allocated chunk numbers for their uplink transmission to the ACK/NACK channels used for the acknowledgments of that data. The ACK/NACK module 35 is also operable to transmit the ACK/NACK commands for the received data on the corresponding ACK/NACK channels for reception by the mobile telephones 3.

Mobile Telephone

Figure 7:
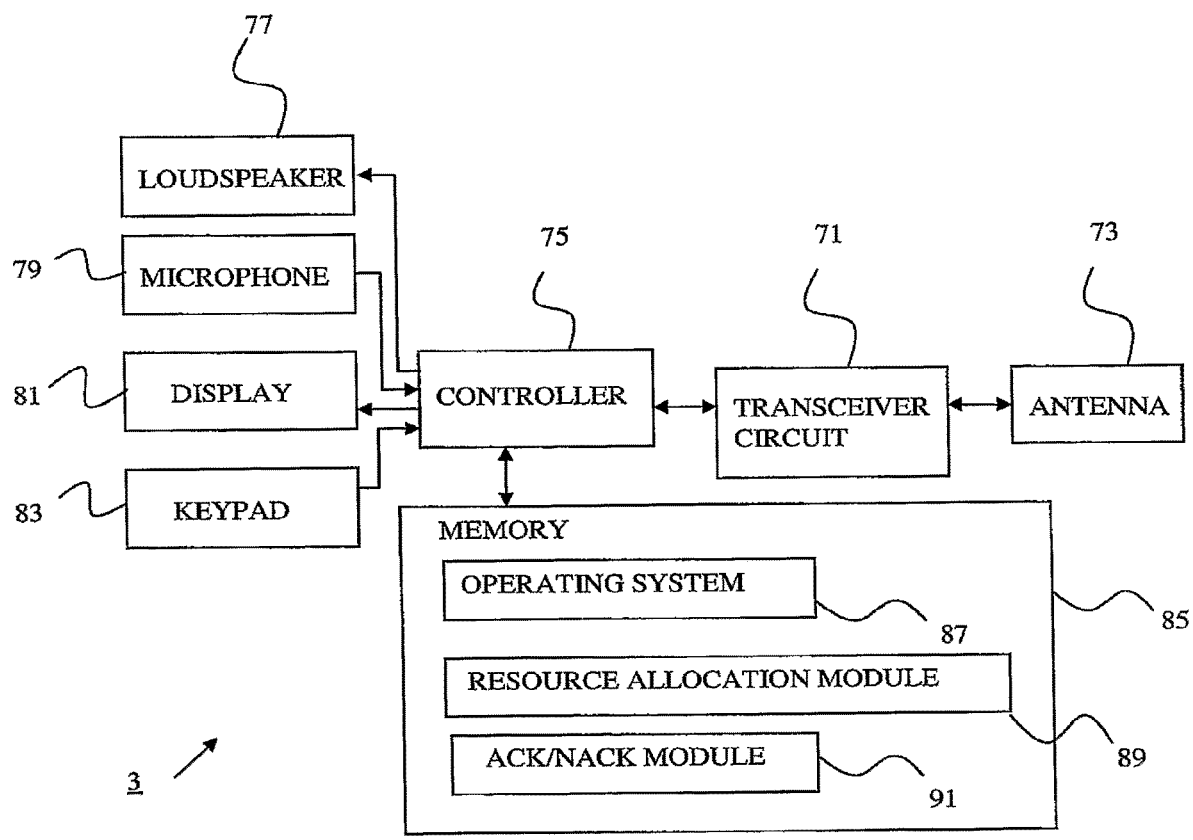
FIG. 7 is a block diagram illustrating the main components of one of the mobile telephones shown in FIG. 1.

FIG. 7 schematically illustrates the main components of each of the mobile telephones 3 shown in FIG. 1. As shown, the mobile telephones 3 include a transceiver circuit 71 that is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a resource allocation module 89. In this embodiment, they also include an ACK/NACK module 91 that is operable to perform the appropriate mapping to identify the sub-carriers that carry the ACK/NACK commands for the data that the mobile telephone 3 has transmitted. The mobile telephones 3 may be programmed to be able to perform only one of the mappings discussed above (with reference to FIGS. 3 and 4) or if the base station 5 varies the mapping that it uses, then the mobile telephones 3 will have to be informed of the mapping to be used for a given sub-frame.

In the above embodiment, the resources used for the ACK/NACK messages are related to the resources allocated to the mobile telephones 3 for uplink transmissions through an appropriate one-to-one mapping. However, the disadvantage with this approach is that if one mobile telephone 3 is allocated multiple uplink resources, then the same number of resources must be used in the downlink for the ACK/NACK messages, and this is not an efficient use of the system's resources.

Second Embodiment

The above embodiment was first described in the applicant's earlier British patent application GB0612228.7. Since the filing of this application, a number of changes have been made to the proposed E-UTRA air interface. Some of the terminology has changed, so that now a sub-frame is the same as a Transmission Time Interval (TTI) and comprises two 0.5 ms slots, each of which comprises the above described seven OFDM symbols. Also a resource block (RB) or a chunk consists of 12 consecutive sub-carriers in the frequency domain. Additionally, in the current proposal each base station 5 will support only one bandwidth at a time, but it can be upgraded to other bandwidths up to the 20 MHz maximum bandwidth. The mobile telephones 3 that communicate with the base station 5 will all have to support the same bandwidth as the base station 5.

Figure 8:
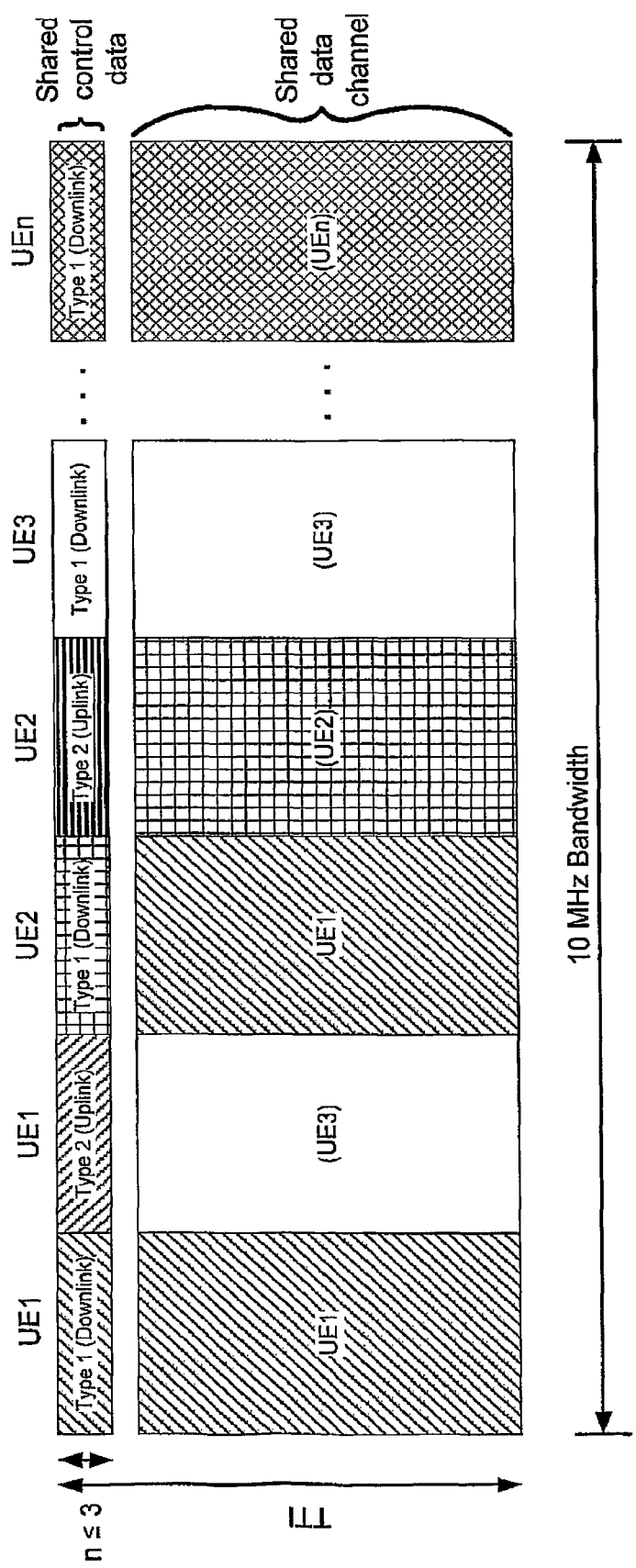
FIG. 8 illustrates a proposed control channel mapping that uses two types of downlink control channels.

The proposal for the L1/L2 control channel structure (over which the resource allocations are signalled) has also changed. In particular, the current proposal, illustrated in FIG. 8, is to reserve a certain amount of time-frequency resources for downlink signalling in the first n OFDM symbols, where n≤3 and it is assumed that the second OFDM symbol will carry the ACK/NACK resources. Each scheduled mobile telephone 3 is assumed to have been allocated one or more control channels within the operating bandwidth of the base station 5 (in this example 10 MHz). The available resources are divided into a number of "control channel elements" (CCEs) of uniform size. A control channel for a mobile telephone 3 can be formed from one of these CCEs or from a number of aggregated CCEs. The more CCEs that are used for one control channel the greater the coding gain that can be achieved, so more CCEs will tend to be used for users with worse channel conditions (eg for users at the edge of the cell). When possible, the frequency position of the control channels should be chosen to span the resources on which the user data is scheduled in order to exploit the superior channel characteristics at these frequency positions or spread across the whole bandwidth to get large frequency diversity. The mapping of the CCEs to the control channels is dynamic and controlled by the base station 5 on a sub-frame by sub-frame basis. A mobile telephone 3 is told a set of CCEs to monitor in case it is being sent a scheduling message. The CCE aggregation is unknown to the mobile telephone 3, so it must try decoding each CCE on its own, then pairs of CCEs together, etc. If the decoding works then it knows that it has found the correct combination and can read the message. Separate control channels may also be provided for each mobile telephone 3 for downlink and uplink resource scheduling.

With this arrangement, the ACK/NACK resources that are used could be defined in a similar way to the first embodiment, but with reference to the resources used to define the downlink (L1/L2) control channel, rather than the allocated uplink resources. However, this approach requires each mobile telephone 3 to know the index of the resources used for its L1/L2 downlink control channel relative to those of the other control channels. However, with the current proposal, each mobile telephone 3 only knows that it correctly decoded its L1/L2 control channel. It does not know the index of the resources used for its control channel relative to those of other mobile telephones 3.

Figure 9:
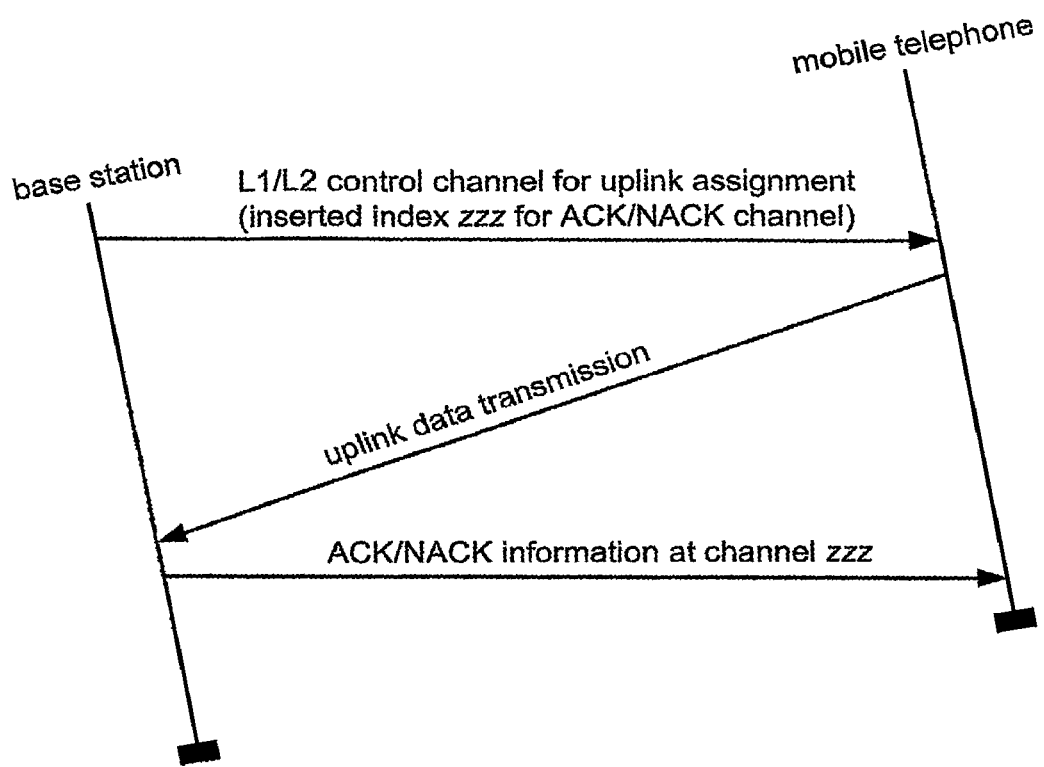
FIG. 9 illustrates the way in which the ACK/NACK resource signalling can be achieved in an alternative embodiment.

Therefore, in this second embodiment, the index of the ACK/NACK resources that will be used by the base station 5 are signalled in advance to the mobile telephone 3 within its L1/L2 control channel used for uplink resource allocation. This process is illustrated in FIG. 9. As shown, the base station 5 signals the mobile telephone 3 over the L1/L2 control channel used for uplink assignment with the index of the ACK/NACK resources that will be used by the base station 5 to signal the ACK/NACK messages to the mobile telephone 3 after it has transmitted its unlink data.

With this arrangement, there is also no need to create separate resources for dynamically scheduled mobile telephones 3 and persistently scheduled mobile telephones 3. In both cases, a pool of resources is put aside for ACK/NACK transmissions for all mobile telephones 3. Then each mobile telephone 3 expecting an ACK/NACK response is signalled an index corresponding to its intended ACK/NACK resources. As those skilled in the art will appreciate, the number of bits required to signal the index will depend upon the number of resources reserved as ACK/NACK resources. Additionally, if more than one ACK/NACK resource is required, then more than one index may be inserted into the L1/L2 control channel.

Modifications and Alternatives

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, a mobile telephone based telecommunication system was described in which the above described ACK/NACK resource signalling techniques were employed. As those skilled in the art will appreciate, the signalling of such ACK/NACK resources can be employed in any communication system that uses a plurality of sub-carriers. In particular, the signalling techniques described above can be used in wire or wireless based communications either using electromagnetic signals or acoustic signals to carry the data. In the general case, the base station would be replaced by a communication node which communicates with a number of different user devices. User devices may include, for example, personal digital assistants, laptop computers, web browsers, etc.

In the above embodiments, the base station was assumed to have an operating bandwidth of 20 MHz in the first embodiment and 10 MHz in the second embodiment and the chunks of carrier frequencies were defined to comprise 25 sub-carriers each. As those skilled in the art will appreciate, the invention is not limited to these particular chunk or bandwidth sizes.

In the above embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of the base station 5 and the mobile telephones 3 in order to update their functionalities.

The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way. The following description will use the nomenclature used in the Long Term Evolution (LTE) of UTRAN. For example, a base station is referred to as eNodeB and a user device is referred to as a UE.

1. Introduction

In the previous RAN1 #48 meeting, the following working assumption was agreed for ACK/NACK control signalling and relevant pre-configured resources [1]:

The resources used for ACK/NACK are configured on a semi-static basis

Defined independently of the control channel format

Implicit relation between the uplink resources used for dynamically scheduled data transmission, or the DL control channel used for assignment, and the downlink ACK/NAK resource used for feedback.

However, the last bullet point does not clearly indicate how the ACK/NACK is signaled to a specific UE.

In this document, we analyse the existing signalling options for ACK/NACK control signalling and propose an efficient signalling mechanism for ACK/NACK for each UE.

2. Downlink ACK/NACK Control Signalling

NodeB sends the ACK/NACK information in response to uplink transmission received from the UE. Subsequently, UE expects its ACK/NACK information in one of the pre-configured downlink resources. The assumption is that there are a number of subcarriers in the downlink that are reserved for carrying ACK/NACK information for all UEs who are expecting such information in the downlink. The number of resources reserved for such usage and their locations in the time/frequency plane can be informed to all UEs in the cell through common signalling in semi-static basis. However, if UE expects ACK/NACK information it needs to know where to look for its ACK/NACK information in these reserved resources.

In RAN1, UE ID-less ACK/NACK signaling has been proposed in order to reduce the signaling overhead [2-6]. It is proposed an implicit signalling for UE where to find its ACK/NACK information in these reserved resources.

3. Implicit ACK/NACK Signalling

Within the implicit signalling, there may be at least two options:
- Option 1: Implicit relation between the uplink resources used for dynamically scheduled data transmission and the downlink ACK/NAK resource used for feedback.
- Option 2: Implicit relation between the DL control channel used for assignment and the downlink ACK/NAK resource used for feedback:
  - One-to-one relationship between the index of the downlink L1/L2 control channel for uplink radio resource assignment and the index of ACK/NACK radio resources.

Option 1 assumes that the number of ACK/NACK resources is equal to the number of uplink resource blocks (RBs) so that there is a relationship between them. UE knows where to expect the ACK/NACK information and it can work out from knowledge of the UL resources used for the UL transmission on which sub-carriers the ACK/NACK information will be transmitted. However, the disadvantage with Option 1 is that if one UE is allocated multiple RBs in the uplink, then there are same number of ACK/NACK resources corresponding to these RBs. It is not efficient that NodeB to signal one ACK/NACK information to all these resources. Hence, Option 1 wastes some downlink resources.

Option 2 assumes one-to-one relationship between the index of the downlink L1/L2 control channel for uplink radio resource assignment and the index of ACK/NACK radio resources. The disadvantage with Option 2 is that UE does not know its index relative to the other downlink L1/L2 control channel for uplink radio resource assignment. UE only knows that it correctly decoded its L1/L2 control channel for uplink radio resource assignment.

In the last way forward agreement [1], it was agreed that the control channels are formed by aggregation of control channel elements (CCE). The assumption is that each UE knows its MCS format so that it can try some decoding attempts blindly to find its downlink L1/L2 control channels. If UE decodes its downlink L1/L2 control channel for uplink radio resource assignment, then it knows the indices of the assigned control channel elements (CCE) relative to all other CCEs in the bandwidth. So, it is possible that UE uses the index of the CCE. However, there is large number of CCEs in the bandwidth and UE may be assigned one or more CCEs. Then, this Option 2 has similar disadvantage as in Option 1, hence, it is not efficient.

4. Index Signalling in the DL L1/L2 Control Channel

The disadvantage of the Option 2 can be avoided by signalling the index of the ACK/NACK resources to the UE in advance so that it knows where to expect ACK/NACK information relative to the other UEs. In this case, the index is inserted in the DL L1/L2 control channel for uplink radio resource assignment as shown in FIG. 8. The number of bits for indexing depends on the number of resources reserved for ACK/NACK resources in each bandwidth.

In our proposal, there is no need to create separate resources for dynamically scheduled UEs and persistently scheduled UEs. In both cases, a pool of resources is put aside for Ack/Nack transmissions for all UEs. Then each UE expecting ACK/NACK response is signalled an index corresponding to its intended ACK/NACK resources.

5. Conclusions

In this document, we have analysed the existing signalling options for ACK/NACK control signalling and show the drawbacks of the existing options. In addition, we have proposed a signalling mechanism that avoids the drawbacks of the existing options by inserting an index in the DL L1/L2 control signalling for uplink radio resource assignment. Hence, we propose:
- The index inserted in the downlink L1/L2 control channel for uplink radio resource assignment must be used for ACK/NACK radio resources.

6. References

[1] R1-071223, "Way Forward on Downlink Control Signaling" Ericsson, Nokia, NTT DoCoMo, et al.
[2] R1-070867, "ACK/NACK Signal Structure in E-UTRA", NTT DoCoMo, et al.
[3] R1-070932, "Assignment of Downlink ACK/NACK channel", Panasonic.
[4] RI-070734, "ACK/NAK Channel Transmission in E-UTRA Downlink", TI
[5] RI-070791, "Downlink Acknowledgement and Group Transmit Indicator Channels", Motorola

What is claimed:
1. A user equipment (UE) comprising:
   a transceiver; and
   a controller configured to:
   control the transceiver to receive first information related to a number of at least one acknowledgment (ACK)/negative acknowledgment (NACK) channel which carries at least one ACK/NACK;
   control the transceiver to receive second information of an offset in frequency; and
   determine at least one ACK/NACK channel resource based on:
   an index of a single resource block allocated for uplink data,
   a value which is based on the first information,
   a total number of resource blocks in a downlink bandwidth, and
   the offset,
   wherein a number of the at least one ACK/NACK channel in the downlink bandwidth is determined based on the first information.

2. The UE according to claim 1, wherein the single resource block corresponds to a chunk.

3. The UE according to claim 1, wherein the at least one ACK/NACK channel resource is determined based on calculation by modulo arithmetic.

4. The UE according to claim 1, wherein the at least one ACK/NACK channel resource is in a frequency domain.

5. A communication method of a user equipment (UE), the method comprising:
   receiving first information related to a number of at least one acknowledgment (ACK)/negative acknowledgment (NACK) channel which carries at least one ACK/NACK;
   receiving second information of an offset in frequency; and determining at least one ACK/NACK channel resource based on:
- an index of a single resource block allocated for uplink data,
- a value which is based on the first information,
- a total number of resource blocks in a downlink bandwidth, and
- the offset, wherein a number of the at least one ACK/NACK channel in the downlink bandwidth is determined based on the first information.

6. The method according to claim 5, wherein the single resource block corresponds to a chunk.

7. The method according to claim 5, wherein the at least one ACK/NACK channel resource is determined based on calculation by modulo arithmetic.

8. The method according to claim 5, wherein the at least one ACK/NACK channel resource is in a frequency domain.

9. A communication node comprising:
- a transceiver; and
- a controller configured to:
  - control the transceiver to transmit first information related to a number of at least one acknowledgment (ACK)/negative acknowledgment (NACK) channel which carries at least one ACK/NACK; and
  - control the transceiver to transmit second information of an offset in frequency, wherein at least one ACK/NACK channel resource is determined based on:
- an index of a single resource block allocated for uplink data,
- a value which is based on the first information,
- a total number of resource blocks in a downlink bandwidth, and
- the offset, and wherein a number of the at least one ACK/NACK channel in the downlink bandwidth is determined based on the first information.

10. The communication node according to claim 9, wherein the single resource block corresponds to a chunk.

11. The communication node according to claim 9, wherein the at least one ACK/NACK channel resource is determined based on calculation by modulo arithmetic.

12. The communication node according to claim 9, wherein the at least one ACK/NACK channel resource is in a frequency domain.

13. A communication method of a communication node, the method comprising:
- transmitting first information related to a number of at least one acknowledgment (ACK)/negative acknowledgment (NACK) channel which carries at least one ACK/NACK; and
- transmitting second information of an offset in frequency, wherein at least one ACK/NACK channel resource is determined based on:
- an index of a single resource block allocated for uplink data,
- a value which is based on the first information,
- a total number of resource blocks in a downlink bandwidth, and
- the offset, and wherein a number of the at least one ACK/NACK channel in the downlink bandwidth is determined based on the first information.

14. The method according to claim 13, wherein the single resource block corresponds to a chunk.

15. The method according to claim 13, wherein the at least one ACK/NACK channel resource is determined based on calculation by modulo arithmetic.

16. The method according to claim 13, wherein the at least one ACK/NACK channel resource is in a frequency domain.

* * * * *